(12) United States Patent
Sekizawa

(10) Patent No.: US 11,498,571 B2
(45) Date of Patent: Nov. 15, 2022

(54) ROAD SURFACE STATE ESTIMATION DEVICE

(71) Applicant: DENSO CORPORATION, Kariya (JP)

(72) Inventor: Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 16/859,524

(22) Filed: Apr. 27, 2020

(65) Prior Publication Data

US 2020/0255019 A1 Aug. 13, 2020

Related U.S. Application Data

(63) Continuation of application No. PCT/JP2018/040124, filed on Oct. 29, 2018.

(30) Foreign Application Priority Data

Oct. 30, 2017 (JP) .............................. JP2017-209401
Jun. 6, 2018 (JP) .............................. JP2018-108583

(51) Int. Cl.
*B60W 40/06* (2012.01)
*B60T 8/172* (2006.01)
(Continued)

(52) U.S. Cl.
CPC ........... *B60W 40/06* (2013.01); *B60C 23/065* (2013.01); *B60T 8/1725* (2013.01); *H04W 4/48* (2018.02);
(Continued)

(58) Field of Classification Search
CPC .......... B60W 40/06; B60C 19/00; G01M 7/02
See application file for complete search history.

(56) References Cited

U.S. PATENT DOCUMENTS 8,983,749 B1 * 3/2015 Singh ...................... B60T 8/172
701/71
9,233,693 B2 * 1/2016 Naito ................ B60W 50/0098
(Continued)

FOREIGN PATENT DOCUMENTS

JP 2005170222 A 6/2005
JP 2007055284 A 3/2007
(Continued)

OTHER PUBLICATIONS

U.S. Appl. No. 16/859,799, filed Apr. 27, 2020, Sekizawa.
U.S. Appl. No. 16/904,260, filed Jun. 17, 2020, SUZUKI et al..

*Primary Examiner* — Qutbuddin Ghulamali
(74) *Attorney, Agent, or Firm* — Harness, Dickey & Pierce, P.L.C.

(57) ABSTRACT

A road surface state estimation device includes a tire-side device and a vehicle-body-side system. The tire-side device is disposed in a tire. The vehicle-body-side system is disposed in a vehicle body. The tire-side device outputs a detection signal corresponding to a magnitude of vibration of the tire, generates road surface data based on the detection signal, and performs data communication with the vehicle-body-side system. The vehicle-body-side system acquires information related to the road surface state, performs the data communication with the tire-side device, transmits vehicle-body-side information indicating that the change in the road surface state occurs to the tire-side device when determining that a change in the road surface state occurs based on the information related to the road surface state, and estimates the road surface state based on the road surface data received by the second transceiver.

10 Claims, 10 Drawing Sheets

(51) Int. Cl.
  *H04W 4/48*   (2018.01)
  *B60C 23/06*  (2006.01)
  *B60C 19/00*  (2006.01)

(52) U.S. Cl.
  CPC ..... *B60C 2019/004* (2013.01); *B60T 2210/10* (2013.01)

(56) References Cited

U.S. PATENT DOCUMENTS

2005/0257609 A1* 11/2005 Mancosu ............ B60C 23/0411
                                                    73/146
2009/0114005 A1*  5/2009 Blixhavn .............. B60C 11/243
                                                    73/146.5
2018/0264894 A1   9/2018 Goto et al.

FOREIGN PATENT DOCUMENTS

| JP | 2009056818 A   | 3/2009  |
| JP | 2016107833 A   | 6/2016  |
| JP | 2018184101 A   | 11/2018 |
| WO | WO-2018199262 A1 | 11/2018 |
| WO | WO-2019087968 A1 | 5/2019  |

* cited by examiner

ROAD SURFACE STATE ESTIMATION DEVICE

CROSS REFERENCE TO RELATED APPLICATIONS

The present application is a continuation application of International Patent Application No. PCT/JP2018/040124 filed on Oct. 29, 2018, which designated the U.S. and claims the benefit of priority from Japanese Patent Application No. 2017-209401 filed on Oct. 30, 2017 and Japanese Patent Application No. 2018-108583 filed on Jun. 6, 2018. The entire disclosures of all of the above applications are incorporated herein by reference.

TECHNICAL FIELD

The present disclosure relates to a road surface state estimation device including a tire-side device that detects vibration received by a tire and generates road surface data indicative of a road surface state based on vibration data, and a vehicle-body-side system that receives the road surface data and estimates the road surface state.

BACKGROUND

Road surface state estimation methods have been proposed. In one of the road surface state estimation methods, vibration received by a tire using an acceleration sensor provided in a back surface of a tire tread is detected, and a road surface state is estimated based on a result of the detection of the vibration. The road surface state estimation method extracts a feature vector from a waveform of the vibration, and calculates degree of similarity of the extracted feature vector to each of support vectors stored for types of the road surface in order to estimate the road surface state. For example, the road surface state estimation method calculates the degree of similarity of the extracted feature vector to each of the support vectors using a kernel function, and estimates that the type of the road surface having the highest degree of similarity corresponds to a currently traveling road surface state, e.g., a dry road surface, a wet road surface, or the like. Such a road surface state estimation method allows highly robust road surface determination to be made.

SUMMARY

The present disclosure provides a road surface state estimation device. The road surface state estimation device includes a tire-side device and a vehicle-body-side system. The tire-side device is disposed in a tire. The vehicle-body-side system is disposed in a vehicle body. The tire-side device outputs a detection signal corresponding to a magnitude of vibration of the tire, generates road surface data based on the detection signal, and performs data communication with the vehicle-body-side system. The vehicle-body-side system acquires information related to the road surface state, performs the data communication with the tire-side device, transmits vehicle-body-side information indicating that the change in the road surface state occurs to the tire-side device when determining that a change in the road surface state occurs based on the information related to the road surface state, and estimates the road surface state based on the road surface data received by the second transceiver.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
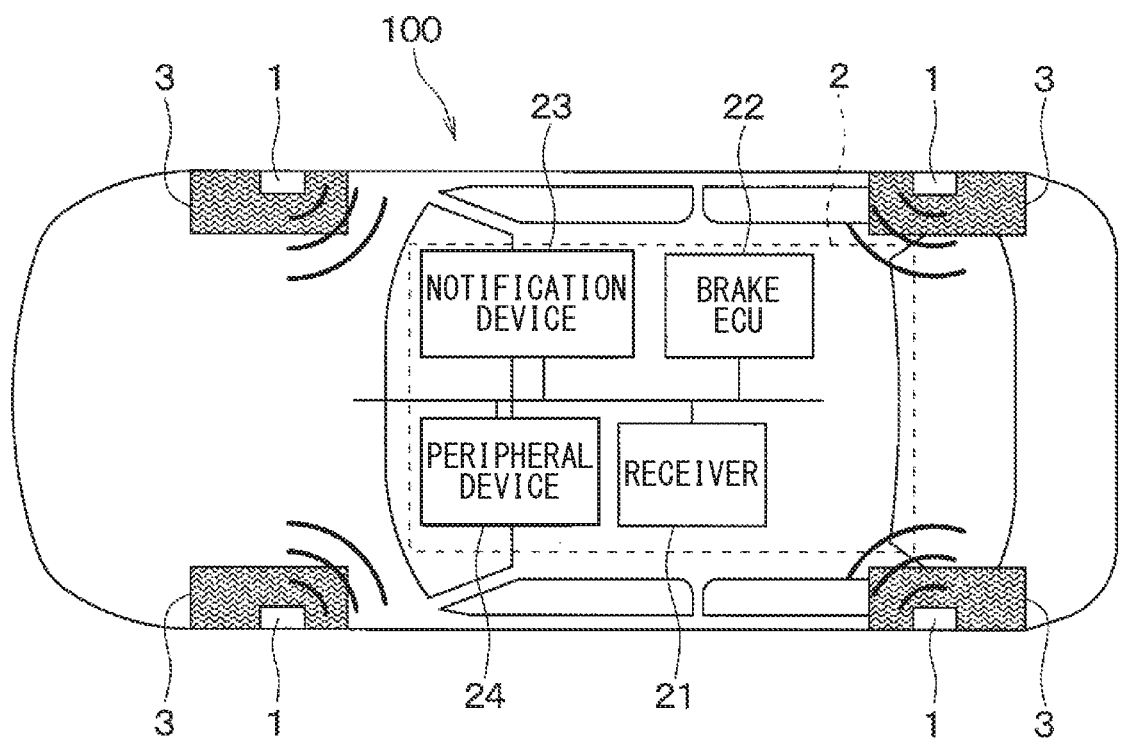
FIG. 1 is a block diagram illustrating a tire device according to a first embodiment mounted on a vehicle.

For example, in a road surface state estimation method, a high load resulting from calculation of a degree of similarity causes a difficulty as described below.

When a control unit provided in a tire calculates the degree of similarity, estimates a road surface state, and transmits a result of the estimation to a vehicle-body-side system, it is necessary to store support vectors in the control unit and perform data processing for the calculation of the degree of similarity. As a result, in the tire, since it is necessary to store and process a large amount of data, an enormous amount of power is consumed and memory consumption in the control unit is huge.

Assumed that the control unit provided in the tire extracts a feature vector and transmits the extracted data to the vehicle-body-side system, and the vehicle-body-side system calculates the degree of similarity to all the support vectors and determines the road surface state. In this case, a time point of data transmission cannot be determined. Thus, a communication frequency needs to increase and thereby power consumption increases.

The present disclosure provides a road surface state estimation device that is capable of saving power at least for a tire-side device. The present disclosure also provides the road surface state estimation device that includes the tire-side device capable of saving a memory storage capacity and power for a control unit in a tire.

An example embodiment of the present disclosure provides a road surface state estimation device that includes a tire-side device and a vehicle-body-side system. The tire-side device is disposed in a tire and configured to transmit road surface data as data related to a road surface state. The vehicle-body-side system is disposed in a vehicle body, and configured to receive the road surface data and estimate the road surface state. The tire-side device includes a vibration detection unit, a first controller, and a first transceiver. The vibration detection unit is configured to output a detection signal corresponding to a magnitude of vibration of the tire. The first controller is configured to generate the road surface data based on the detection signal. The first transceiver is configured to perform data communication with the vehicle-body-side system. The vehicle-body-side system includes a peripheral device, a second transceiver, and a second controller. The peripheral device is configured to acquire information related to the road surface state. The second transceiver is configured to perform the data communication with the tire-side device. The second controller is configured to cause, when determining an occurrence of a change in the road surface state based on the information related to the road surface state acquired by the peripheral device, the second transceiver to transmit vehicle-body-side information indicating the occurrence of the change in the road surface state to the tire-side device, and estimate the road surface state based on the road surface data received by the second transceiver. The first controller includes a change determination unit and a transmission control unit. The change determination unit is configured to determine the occurrence of the change in the road surface state based on the detection signal. The transmission control unit is configured to cause, when the change determination unit determines the occurrence of the change in the road surface state or when the first transceiver receives the vehicle-body-side information, the first transceiver to transmit the road surface data.

In the example embodiment of the present disclosure, when the road surface state estimation device estimates the road surface state, the road surface data is transmitted from the tire-side device at a time point when the road surface state has changed. Specifically, the tire-side device transmits the road surface data at a time point when the tire-side device or the vehicle-body-side system determines that the road surface state has changed. This configuration can reduce a communication frequency and save power for the first control unit in the tire.

It is also possible to not only provide a configuration in which the first control unit of the tire-side device includes a support vector storage unit for storing support vectors, but also provide a configuration in which the first control unit of the tire-side device does not include the support vector storage unit. When the first control unit of the tire-side device does not includes the support vector storage unit, it is also possible to save a memory storage capacity for the first control unit in the tire.

The following will describe embodiments of the present disclosure based on the drawings. Note that, in the following description of the individual embodiments, like or equivalent component parts are given like reference characters or numerals.

First Embodiment

Referring to FIGS. 1 to 10, a description will be given of a tire device 100 having a road surface state estimation function according to a first embodiment. The tire device 100 according to the first embodiment estimates a road surface state during traveling based on vibration applied to a ground contact surface of a tire provided in each of wheels of a vehicle, and performs warning of danger to the vehicle, vehicle movement control, and the like based on the road surface state.

Figure 2:
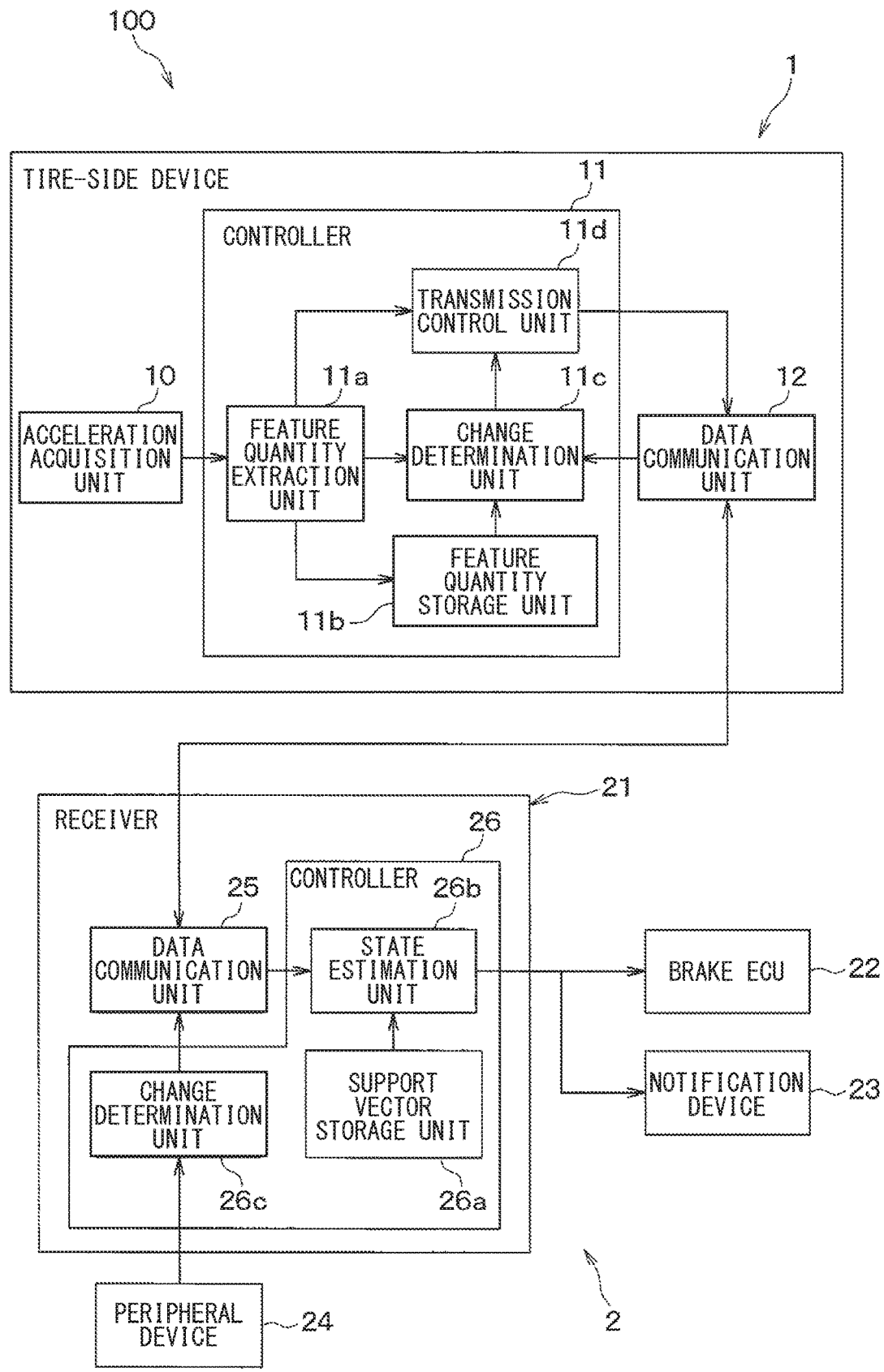
FIG. 2 is a block diagram schematically illustrating a tire-side device and a vehicle-body-side system.

As illustrated in FIGS. 1 and 2, the tire device 100 includes tire-side devices 1 attached to respective wheels and a vehicle-body-side system 2 attached to a vehicle body. The vehicle-body-side system 2 includes a receiver 21, an electronic control device for brake control (hereinafter referred to as a brake ECU) 22, a notification device 23, a peripheral device 24, and the like. Note that a part of the tire device 100 which performs the road surface state estimation function corresponds to a road surface state estimation device. In the first embodiment, each of the tire-side devices 1, and the receiver 21 and the peripheral device 24 of the vehicle-body-side system 2 are included in the road surface state estimation device.

The tire device 100 of the first embodiment causes each of the tire-side devices 1 to transmit data (hereinafter referred to as road surface data) corresponding to a road surface state of a road surface traveled by a tire 3 and also causes the receiver 21 to receive the road surface data and estimate the road surface state. Specifically, the tire-side device 1 transmits the road surface data when determining that there is a change in the road surface state. The vehicle-body-side system 2 also determines that there is a change in the road surface state based on information from the peripheral device 24. When there is a change in the road surface state, the vehicle-body-side system 2 transmits the information (hereinafter referred to as the vehicle-body-side information) indicative of the occurrence of the change in the road surface state to the tire-side device 1. In other words, the tire-side device 1 transmits the road surface data not only when determining that there is a change in the road surface state, but also when the vehicle-body-side information is transmitted to the tire-side device 1. The receiver 21 receives the road surface data transmitted when there is a change in the road surface state, and estimates the road surface state based on the received road surface data.

The tire device 100 transmits the road surface state estimated by the receiver 21 to the notification device 23, and causes the notification device 23 to notify the result of the estimation of the road surface state. As a result, the tire device 100 is capable of notifying a driver of the road surface state such as, e.g., a dry road, a wet road, or a frozen road, and also warn the driver when the road has a slippery road surface. The tire device 100 also notifies the driver of the road surface state to the brake ECU 22 which controls vehicle movement or the like to cause the brake ECU 22 or the like to perform vehicle movement control for avoiding danger. For example, when the road is frozen, the brake ECU 22 or the like is caused to reduce a braking force generated based on an amount of brake operation compared to that when the road is dry and thus perform vehicle movement control corresponding to a case where a road surface μ is low. Specifically, the tire-side device 1 and the vehicle-body-side system 2 are configured as follows.

Figure 3:
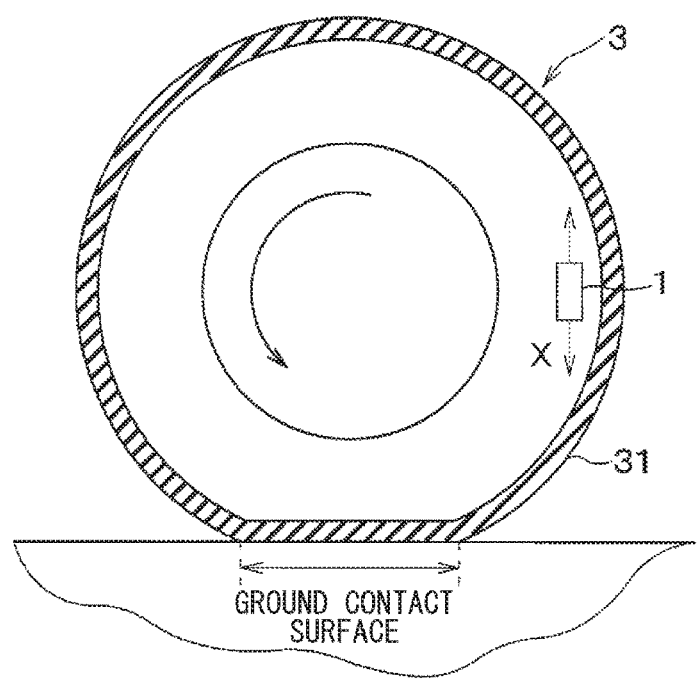
FIG. 3 is a sectional schematic diagram illustrating a tire to which the tire-side device is attached.

The tire-side device 1 is attached to each of the tires 3 to be capable of performing bidirectional communication with the vehicle-body-side system 2. Specifically, as illustrated in FIG. 2, the tire-side device 1 includes an acceleration acquisition unit 10, a control unit 11, and a data communication unit 12. As illustrated in FIG. 3, the tire-side device 1 is attached to a back surface of a tread 31 of each of the tires 3.

The acceleration acquisition unit 10 is provided as a vibration detection unit for detecting the vibration applied to the tire 3. For example, the acceleration acquisition unit 10 is provided by an acceleration sensor. In this case, the acceleration acquisition unit 10 outputs an acceleration detection signal as a detection signal corresponding to vibration in a direction in contact with a circular path followed by the tire-side device 1 when the tire 3 rotates, that is, a tire tangential direction shown by an arrow X in FIG. 3. More specifically, the acceleration acquisition unit 10 generates, as the detection signal, an output voltage having one of two directions shown by the arrow X as a positive direction and the opposite direction as a negative direction. For example, the acceleration acquisition unit 10 detects an acceleration at a predetermined sampling period which is predetermined to be shorter than a period of one rotation of the tire 3, and outputs the detected acceleration as the detection signal.

The control unit 11 corresponds to a first controller. The control unit 11 is provided by a known microcomputer including a CPU, a ROM, a RAM, an I/O, and the like, and performs the processes described above based on a program stored in the ROM or the like. The control unit 11 includes, as functional units which perform those processes, a feature quantity extraction unit 11a, a feature quantity storage unit 11b, a change determination unit 11c, and a transmission control unit 11d.

The feature quantity extraction unit 11a processes the detection signal output from the acceleration acquisition unit 10 as the detection signal indicative of vibration data in the tire tangential direction, and extracts a feature quantity of tire vibration. In the first embodiment, by performing signal processing of the detection signal for the acceleration (hereinafter referred to as the tire G) of the tire 3, the feature quantity extraction unit 11a extracts the feature quantity of the tire G. The feature quantity extraction unit 11a transmits, as the road surface data, data including the extracted feature quantity to the data communication unit 12 via the transmission control unit 11d. Note that details of the feature quantity mentioned herein will be described later.

The feature quantity storage unit 11b stores the feature quantity (hereinafter referred to as immediately previous feature quantity) extracted by the feature quantity extraction unit 11a before one rotation of each of the tires 3. Since the one rotation made by the tire 3 can be recognized by a method described later, the feature quantity corresponding to the one rotation is stored every time the tire 3 rotates once. Note that, for the feature quantity corresponding to the one rotation of the tire 3, it may be possible to update data every time the tire 3 rotates once or accumulate data corresponding to a plurality of rotations and delete the oldest data every time the tire 3 rotates once. However, in terms of saving a memory storage capacity for the control unit 11 in the tire 3, an amount of data to be accumulated is preferably reduced, and therefore data is preferably updated every time the tire 3 rotates once.

The change determination unit 11c determines the presence or absence of a change in the road surface state based on the feature quantity (hereinafter referred to as the present feature quantity) extracted by the feature quantity extraction unit 11a during the most recent rotation of the tire 3 and the immediately previous feature quantity of the tire 3 stored in the feature quantity storage unit 11b. The change determination unit 11c also determines the presence or absence of a change in the road surface state based on whether or not the vehicle-body-side information is received from the receiver 21 of the vehicle-body-side system 2, as will be described later. Then, when determining that there is a change in the road surface state, the change determination unit 11c transmits a control signal indicative of the occurrence of the change to the transmission control unit 11d.

Note that, the change determination unit 11c distinguishes the determination of the presence or absence of a change in the road surface state based on the feature quantity in the tire-side device 1 from the determination of the presence or absence of a change in the road surface state based on the vehicle-body-side information from the vehicle-body-side system 2. In the following description, the former determination is referred to as the "tire-side determination", while the latter determination is referred to as the "vehicle-body-side determination".

The transmission control unit 11d controls data transmission from the data communication unit 12. When a control signal indicating that there is a change in the road surface state is transmitted to the transmission control unit 11d from the change determination unit 11c, the transmission control unit 11d transmits the road surface data including the present feature quantity extracted at that time by the feature quantity extraction unit 11a to the data communication unit 12. Accordingly, in the first embodiment, when even either one of a result of the tire-side determination and a result of the vehicle-body-side determination indicates the occurrence of a change in the road surface state, the road surface data is transmitted to the data communication unit 12.

The data communication unit 12 is provided by a first transceiver and performs data communication with a data communication unit 25 described later of the receiver 21 in the vehicle-body-side system 2. The data communication unit 12 described herein has a single configuration, but may also be configured as a transmission unit and a reception unit which are separate from each other. As a mode of the bidirectional communication, various modes can be used appropriately, and Bluetooth communication including BLE (abbreviation of Bluetooth Low Energy) communication, a wireless LAN (abbreviation of Local Area Network) such as wifi, Sub-GHz communication, ultra-wide band communication, ZigBee, or the like can be used appropriately. Note that "Bluetooth" is a registered trademark.

For example, when the road surface data is transmitted to the data communication unit 12 from the transmission control unit 11d, the data communication unit 12 transmits the road surface data including the present feature quantity at that time point. The time point of the data transmission from the data communication unit 12 is controlled by the transmission control unit 11d, and therefore the data transmission is not performed every time the tire 3 rotates once, but is performed when there is a change in the road surface state.

When the vehicle-body-side information is transmitted to the data communication unit 12 from the data communication unit 25, the data communication unit 12 receives the vehicle-body-side information and transmits the vehicle-body-side information to the change determination unit 11c. This allows the change determination unit 11c to determine the presence or absence of a change in the road surface state based even on the vehicle-body-side information transmitted to the change determination unit 11c.

As illustrated in FIG. 2, the receiver 21 includes the data communication unit 25 and a control unit 26.

The data communication unit 25 is provided by a second transceiver which performs data communication with the tire-side device 1, and receives the road surface data including the present feature quantity transmitted from the data communication unit 12 of the tire-side device 1 and transmits the road surface data to the control unit 26. When the vehicle-body-side information indicative of the occurrence of a change in the road surface state is transmitted to the data communication unit 25 from the control unit 26 based on the information from the peripheral device 24, the data communication unit 25 transmits the vehicle-body-side information to the data communication unit 12 of each of the tire-side devices 1. The data communication unit 25 described herein has a single configuration, but may also be configured to include a transmission unit and a reception unit which are separate from each other.

The control unit 26 corresponds to a second controller. The control unit 26 is provided by a known microcomputer including a CPU, a ROM, a RAM, an I/O, and the like, and performs various processes based on programs stored in the ROM or the like. The control unit 26 includes, as functional units which perform the various processes, a support vector storage unit 26a, a state estimation unit 26b, and a change determination unit 26c.

The support vector storage unit 26a stores support vectors for each type of the road surface. The support vector refer to a feature quantity serving as a model, which is obtained by, e.g., learning using a support vector machine. A vehicle including the tire-side device 1 is experimentally caused to run on each type of the road surface. The feature quantity extracted at that time by the feature quantity extraction unit 11a for a predetermined number of tire rotations is learned and, from the extracted feature quantity, typical feature quantity corresponding to a predetermined number of rotations is extracted to be used as the support vector. For example, the feature quantity corresponding to 1,000,000 rotations is learned for each type of the road surface and, from the learned feature quantity, typical feature quantity corresponding to 100 rotations is extracted to be used as the support vector.

The state estimation unit 26b compares the present feature quantity transmitted from the tire-side device 1 and received by the data communication unit 25 to the support vector for each type of the road surface stored in the support vector storage unit 26a to estimate the road surface state. For example, the state estimation unit 26b compares the present feature quantity to the support vector stored for each type of the road surface, and estimates the road surface corresponding to the support vector closest to the present feature quantity as a currently traveling road surface.

The change determination unit 26c determines that there is a change in the road surface state based on the information from the peripheral device 24. When there is a change in the road surface state, the change determination unit 26c causes the data communication unit 25 to transmit the vehicle-body-side information indicative of the occurrence of the change in the road surface state to the data communication unit 12 of each of the tire-side devices 1. As will be described later, any of various devices can be used as the peripheral device 24. Accordingly, depending on which device is used as the peripheral device 24, a process to be performed in the change determination unit 26c differs, which will be described later.

When the state estimation unit 26b estimates the road surface state, the control unit 26 transmits the estimated road surface state to the notification device 23, and causes the notification device 23 to notify the driver of the road surface state as required. As a result, the driver tries to drive in consideration of the road surface state and can avoid danger to the vehicle. For example, the control unit 26 may cause the notification device 23 to constantly display the estimated road surface state or display the road surface state to warn the drive when the estimated road surface state is that of a wet road, a frozen road, or the like, and the driver is required to drive more carefully. In addition, from the receiver 21, the road surface state is transmitted to an ECU for performing the vehicle movement control such as the brake ECU 22 and, based on the transmitted road surface state, the vehicle movement control is performed.

The brake ECU 22 is included in a braking control device which performs various brake control. Specifically, the brake ECU 22 drives an actuator for controlling a brake fluid pressure to increase or reduce a wheel cylinder pressure and control the braking force. The brake ECU 22 can also independently control a braking force applied to each of the wheels. When the road surface state is transmitted from the receiver 21 to the brake ECU 22, the brake ECU 22 performs control of the braking force as vehicle movement control based on the road surface state. For example, when the transmitted road surface state indicates a frozen road, the brake ECU 22 reduces the braking force generated based on an amount of brake operation performed by the driver compared to that generated when the transmitted road surface state is a dry road surface. This configuration can reduce wheel slip and allow the driver to avoid danger to the vehicle.

The notification device 23 is provided by, e.g., a meter indicator or the like and used when the driver is notified of the road surface state. When the notification device 23 is provided by the meter indicator, the meter indicator is disposed at a place where the meter indicator is visually recognizable by the driver while driving the vehicle. For example, in this case, the notification device 23 is disposed in an instrument panel in the vehicle. When the road surface state is transmitted from the receiver 21 to the notification device 23, the meter indicator performs display in order that the driver can recognize the road surface state, and thus allows the road surface state to be visually reported to the driver.

Note that the notification device 23 may also be formed of a buzzer, a voice guidance device, or the like. In that case, the notification device 23 can aurally report the road surface state to the driver using a buzzer sound or voice guidance. As the notification device 23 that performs visual reporting, the meter indicator has been described by way of example, but the notification device 23 may also be provided by a display element which displays information, such as a head-up display.

The peripheral device 24 includes various devices provided in the vehicle. The peripheral device 24 acquires information related to the road surface state and transmits the acquired information to the change determination unit 26c. As the various devices provided in the vehicle, any device may be used as long as the device can acquire the information related to the road surface state. For example, an in-vehicle camera, a wiper device, the brake ECU 22, or the like may be used appropriately as the peripheral device 24.

When the in-vehicle camera is used appropriately as the peripheral device 24, using the in-vehicle camera, image data of a road surface ahead of the vehicle is acquired, and the acquired image data is transmitted to the change determination unit 26c. In this case, the change determination unit 26c analyzes the image data transmitted from the in-vehicle camera and determines that the road surface state has changed based on a result of the analysis. When the wiper device is used appropriately as the peripheral device 24, driving information of the wiper device is transmitted to the change determination unit 26c. The wiper device is driven when, e.g., it rains or snows. Accordingly, the change determination unit 26c acquires information showing that the wiper is driven from a control unit of the wiper device and determines that the road surface state has changed based on the acquired information. When the brake ECU 22 is used appropriately as the peripheral device 24, the ECU 22 transmits information related to the road surface state, which is used for various control performed thereby, to the change determination unit 26c. The brake ECU 22 performs various control such as ABS (abbreviation of Antilock Brake System) and VSC (abbreviation of Vehicle stability control), and estimates a road surface friction coefficient or the road surface state. Accordingly, when the information related to the road surface state is transmitted to the change determination unit 26c from the brake ECU 22, the change determination unit 26c determines that the road surface state has changed based on the information. Note that, to the estimation of the road surface state based on the analysis of the acquired image data using the in-vehicle camera and to the estimation of the road surface state by the brake ECU 22, a known method may be used appropriately.

Thus, the tire device 100 according to the first embodiment is configured. Note that the individual units included in the vehicle-body-side system 2 are connected to each other via an in-vehicle LAN (abbreviation of Local Area Network) based on, e.g., CAN (abbreviation of Controller Area Network) communication. This allows the individual units to transmit information to each other via the in-vehicle LAN.

Next, a description will be given of details of the feature quantity extracted by the feature quantity extraction unit 11a described above and of the determination of a change in the road surface state by the change determination unit 11c.

First, a description will be given of the feature quantity extracted by the feature quantity extraction unit 11a. The feature quantity mentioned herein are a quantity indicative of feature of vibration applied to the tire 3, which has been acquired by the acceleration acquisition unit 10, and is represented as, e.g., the feature vector.

Figure 4:
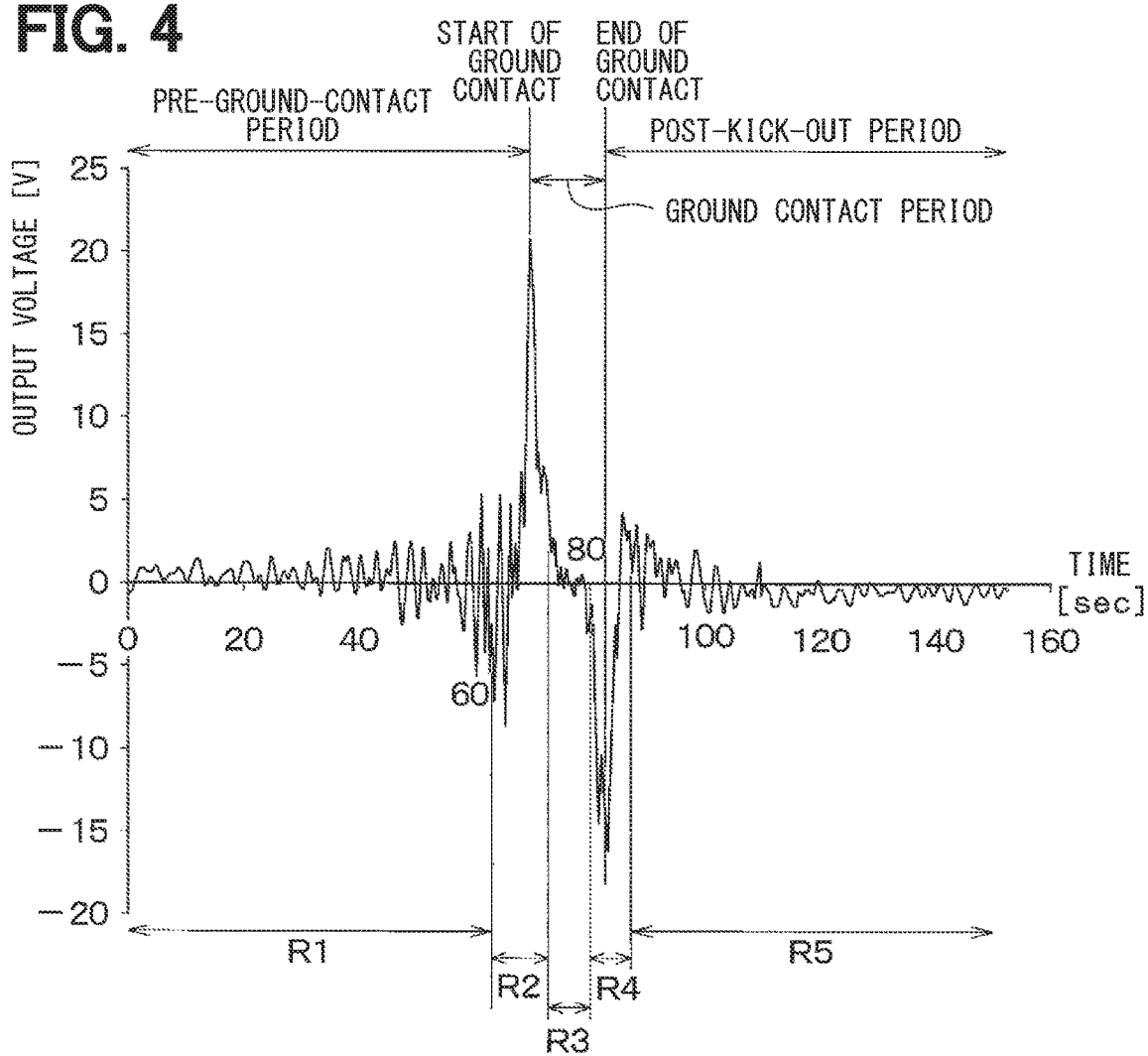
FIG. 4 is a chart illustrating a voltage output from an acceleration acquisition unit during a rotation of the tire.

The voltage waveform of the detection signal output from the acceleration acquisition unit 10 during tire rotation is, e.g., the waveform illustrated in FIG. 4. As illustrated in FIG. 4, at a ground contact start time when a portion of the tread 31 corresponding to a place where the acceleration acquisition unit 10 is disposed starts to come into contact with the ground with the rotation of the tire 3, the output voltage from the acceleration acquisition unit 10 has a maximum value. A peak value at the ground contact start time when the output voltage from the acceleration acquisition unit 10 has the maximum value is hereinafter referred to as a first peak value. As also illustrated in FIG. 4, at a ground contact end time when the portion of the tread 31 corresponding to the place where the acceleration acquisition unit 10 is disposed, which has been in contact with the ground, comes out of contact with the ground, the output voltage from the acceleration acquisition unit 10 has a minimum value. A peak value at the ground contact end time when the output voltage from the acceleration acquisition unit 10 has the minimum value is hereinafter referred to as a second peak value.

The following is the reason why the output voltage from the acceleration acquisition unit 10 has the peak values with the time points described above. That is, when the portion of the tread 31 corresponding to the place where the acceleration acquisition unit 10 is disposed comes into contact with the ground with the rotation of the tire 3, a portion of the tire 3 which has been a generally cylindrical surface in the vicinity of the acceleration acquisition unit 10 receives pressure to be deformed into a planar shape. At this time, the acceleration acquisition unit 10 receives an impact, and consequently the output voltage from the acceleration acquisition unit 10 has the first peak value. On the other hand, when the portion of the tread 31 corresponding to the place at which the acceleration acquisition unit 10 is disposed comes out of contact with the ground contact surface with the rotation of the tire 3, the tire 3 is released from the pressure in the vicinity of the acceleration acquisition unit 10 and returned from the planar shape to a generally cylindrical shape. The acceleration acquisition unit 10 receives an impact when the tire 3 is returned to the original shape, and consequently the output voltage from the acceleration acquisition unit 10 has the second peak value. Thus, the output voltage from the acceleration acquisition unit 10 has the first and second peak values at the ground contact start time and the ground contact end time, respectively. In addition, since the direction of the impact when the tire 3 receives the pressure is opposite to the direction of the impact when the tire 3 is released from the pressure, signs of the output voltages are also opposite to each other.

A moment when the portion of the tire tread 31 corresponding to the place where the acceleration acquisition unit 10 is disposed comes into contact with the ground at the road surface is assumed to fall within a "step-on region", while a moment when the portion of the tire tread 31 corresponding to the place where the acceleration acquisition unit 10 is disposed leaves the road surface is assumed to fall within a "kick-out region". The "step-on region" includes the time point at which the first peak value is reached, while the "kick-out region" includes the time point at which the second peak value is reached. It is also assumed that a region before the "step-on region" is a "pre-step-on region", a region between the step-on region and the kick-out region, i.e., a region where the portion of the tire tread 31 corresponding to the place where the acceleration acquisition unit 10 is disposed is in contact with the ground is a "pre-kick-out region", and a region after the kick-out region is a "post-kick-out region". Thus, a period during which the portion of the tire tread 31 corresponding to the place where the acceleration acquisition unit 10 is disposed is in contact with the ground and periods before and after the period can be separated into the five regions. Note that, in FIG. 4, the "pre-step-on region", the "step-on region", the "pre-kick-out region", the "kick-out region", and the "post-kick-out region" of the detection signal are successively shown as five regions R1 to R5.

Depending on the road surface state, vibration occurred in the tire 3 varies in each of the regions, and the detection signal from the acceleration acquisition unit 10 varies from each of the regions. Accordingly, by subjecting the detection signal from the acceleration acquisition unit 10 in each of the regions to frequency analysis, the road surface state of the road surface in which the vehicle is traveling is detected. For example, in a slippery road surface state such as that of a hard-compacted snow road, a sheering force at a kick-out time deteriorates, and consequently a band value selected in a 1 kHz to 4 kHz band decreases in the kick-out region R4 and the post-kick-out region R5. Thus, each of frequency components of the detection signal from the acceleration acquisition unit 10 varies depending on the road surface state, and therefore it is possible to determine the road surface state based on the frequency analysis of the detection signal.

Figure 5:
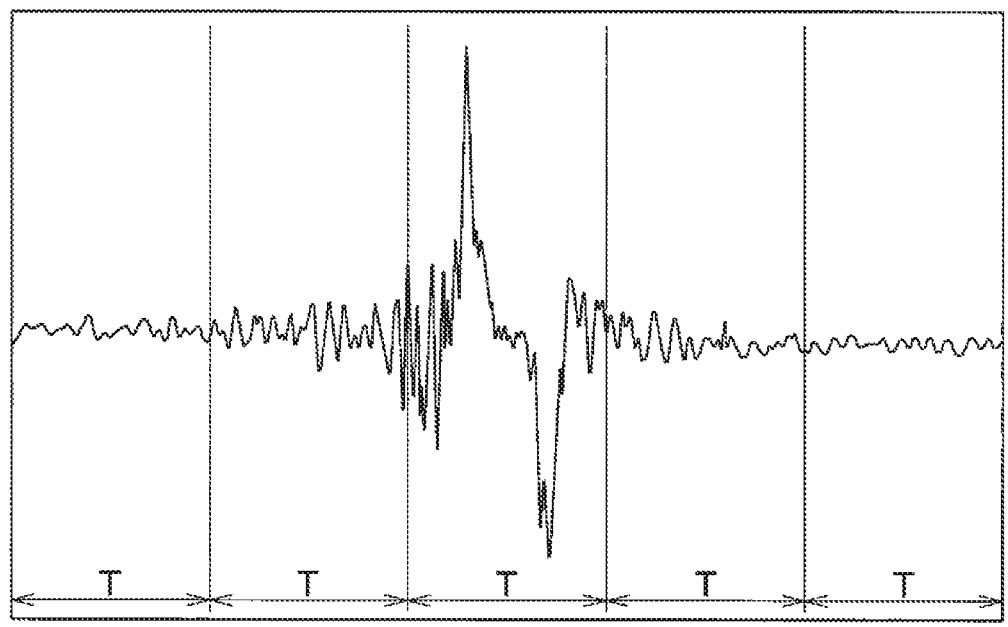
FIG. 5 is a diagram illustrating a detection signal acquired from the acceleration acquisition unit and divided for time windows each having a predetermined time width T.

Accordingly, the feature quantity extraction unit 11a divides, by each of time windows having a predetermined time width T, the detection signal from the acceleration acquisition unit 10 corresponding to one rotation of the tire 3 which exhibits a continuous time axis waveform into the plurality of segments as illustrated in FIG. 5, and performs the frequency analysis in each of the segments to extract the feature quantity. Specifically, by performing the frequency analysis in each of the segments, the feature quantity extraction unit 11a determines a power spectral value in each of the frequency bands, i.e., a vibration level in a specified frequency band, and uses the power spectral values as the feature quantities.

Note that the number of the segments resulting from the segmentation using the time window having the time width T is a value which varies depending on a vehicle speed, more specifically the rotating speed of the tire 3. In the following description, the number of segments corresponding to one rotation of the tire is assumed to be n (n is a natural number).

For example, the power spectral values obtained by causing the detection signal in each of the segments to pass through filters in a plurality of specified frequency bands, e.g., five bandpass filters in a 0 to 1 kHz frequency band, a 1 to 2 kHz frequency band, a 2 to 3 kHz frequency band, a 3 to 4 kHz frequency band, and a 4 to 5 kHz frequency band are used as the feature quantities. The feature quantities are referred to as the feature vectors. When each of the power spectral values in the individual specified frequency bands is represented by $a_{ik}$, a feature vector Xi of a given segment i (where i is a natural number satisfying $1 \leq i \leq n$) is given as a matrix having the power spectral values $a_{ik}$ as elements by the following expression.

$$X_i = \begin{bmatrix} a_{i1} \\ a_{i2} \\ a_{i3} \\ a_{i4} \\ a_{i5} \end{bmatrix} \quad \text{[Expression 1]}$$

Note that k in each of the power spectral values $a_{ik}$ is the number of the specified frequency bands, i.e., the number of the bandpass filters. When the 0 to 5 kHz band is segmented into the five regions as described above, k=1 to 5 is satisfied. A determinant X collectively showing feature vectors X1 to Xn of all the segments 1 to n is given by the following expression.

$$X = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix} \quad \text{[Expression 2]}$$

The determinant X serves as the expression indicative of the feature quantities corresponding to one tire rotation. The feature quantity extraction unit 11a performs the frequency analysis to the detection signal from the acceleration acquisition unit 10 to extract the feature quantities represented by the determinant X.

Subsequently, a description will be given of determination of a change in the road surface state, which is performed by the change determination unit 11c. The determination is made by calculating a degree of similarity using the present feature quantities extracted by the feature quantity extraction unit 11a and the immediately previous feature quantities stored in the feature quantity storage unit 11b.

As described above, it is assumed, with respect to the determinant X indicative of the feature quantities, that a determinant indicative of the present feature quantities is X(r), a determinant indicative of the immediately previous feature quantities is X(r−1), and the power spectral values $a_{ik}$ serving as respective elements of each of the determinants are represented by $a(r)_{ik}$ and $a(r-1)_{ik}$. In that case, the determinant X(r) indicative of the present feature quantities and the determinant X(r−1) indicative of the immediately previous feature quantities are respectively represented as follows.

$$X(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix} \quad \text{[Expression 3]}$$

$$X(r-1) = \begin{pmatrix} a(r-1)_{11} & a(r-1)_{21} & \ldots & a(r-1)_{n1} \\ a(r-1)_{12} & a(r-1)_{22} & \ldots & a(r-1)_{n2} \\ a(r-1)_{13} & a(r-1)_{23} & \ldots & a(r-1)_{n3} \\ a(r-1)_{14} & a(r-1)_{24} & \ldots & a(r-1)_{n4} \\ a(r-1)_{15} & a(r-1)_{25} & \ldots & a(r-1)_{n5} \end{pmatrix} \quad \text{[Expression 4]}$$

The degree of similarity represents a degree to which the feature quantities represented by the two determinants are similar to each other. When the degree of similarity is higher, the feature quantities represented by the two determinants are more similar to each other. In the first embodiment, the change determination unit 11c determines the degree of similarity using a kernel method, and determines a change in the road surface state based on the degree of similarity. The change determination unit 11c calculates herein an inner product of the determinant X(r) during the most recent rotation of the tire 3 and the determinant X(r−1) during the immediately previous rotation of the tire 3, i.e., a distance between respective coordinates represented by the respective feature vectors Xi of the individual segments resulting from the segmentation using each of the time windows having the predetermined time width T in a feature space, and uses the inner product as the degree of similarity.

Figure 6:
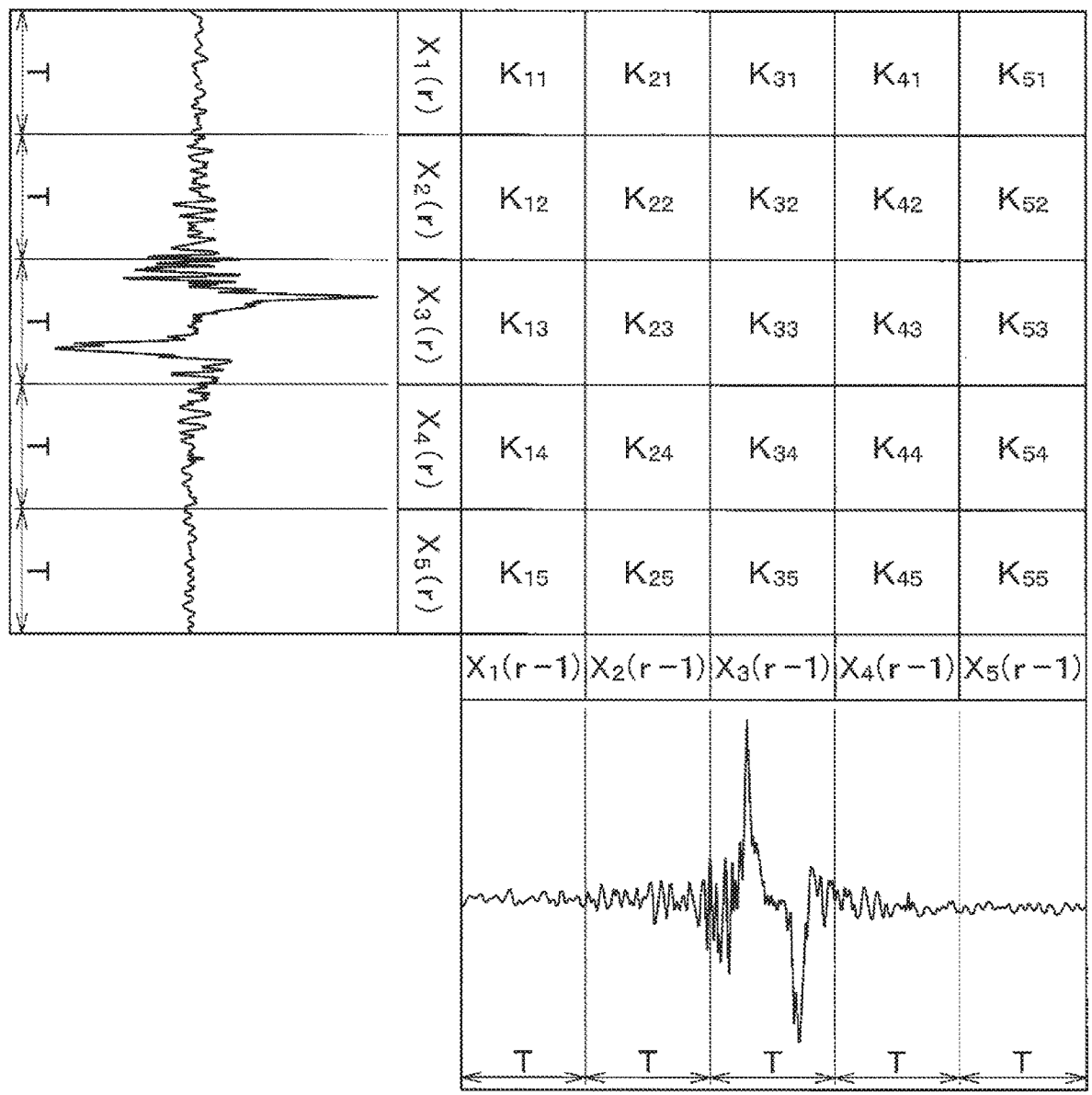
FIG. 6 is a diagram illustrating relationships between determinants $Xi(r)$ and $Xi(r-1)$ and a distance $K_{yz}$ in each of segments resulting from segmentation of a time axis waveform during a most recent rotation of the tire and a time axis waveform during an immediately previous rotation of the tire by each of the time windows having the predetermined time width T.

For example, as illustrated in FIG. 6, as the time axis waveform of the detection signal from the acceleration acquisition unit 10, each of the time axis waveform during the most recent rotation of the tire 3 and the time axis waveform during the immediately previous rotation of the tire 3 is segmented into individual segments by the time window having the predetermined time width T. In the case of the illustrated example, each of the time axis waveforms is segmented into the five segments, and accordingly n=5 is satisfied, and i is given by $1 \leq i \leq 5$. It is assumed herein that, as illustrated in the drawing, the feature vectors Xi of the individual segments during the most recent rotation are Xi(r), and the feature vectors of the individual segments during the immediately previous rotation are Xi(r−1). In that case, distances $K_{yz}$ between the coordinates represented by the feature vectors Xi of the individual segments are represented as in cells where cells containing the feature vectors Xi(r) of the individual segments during the most recent rotation, which are arranged laterally thereto, and cells containing the feature vectors Xi(r−1) of the individual segments during the immediately previous rotation, which are arranged vertically thereto, cross each other. Note that, in each of the distances $K_{yz}$, y corresponds to i in Xi(r−1), while z corresponds to i in Xi(r). In addition, there is no significant change between a vehicle speed during the most recent rotation and a vehicle speed during the immediately previous rotation, and therefore the number of the segments during the most recent rotation is basically equal to the number of the segments during the immediately previous rotation.

In the first embodiment, the feature vectors Xi are acquired by segmenting each of the time axis waveform into the five specified frequency bands, and consequently the feature vectors Xi of the individual segments are represented in a six-dimensional space including the time axis. Accordingly, the distances between the coordinates represented by the feature vectors Xi of the individual segments correspond to distances between the coordinates in the six-dimensional space. However, the distances between the coordinates represented by the feature vectors Xi of the individual segments are smaller as the feature quantities are more similar to each other and larger as the feature quantities are less similar to each other. Thus, smaller distances represent a higher degree of similarity, while larger distances represent a lower degree of similarity.

For example, when segments 1 to n are provided by time division, each of the distances $K_{yz}$ between the coordinates represented by the feature vectors of the individual segments 1 is given by the following expression.

$$Kyz = \sqrt{\{a(r)_{11} - a(r-1)_{11}\}^2 + \{a(r)_{12} - a(r-1)_{12}\}^2 + \ldots \{a(r)_{15} - a(r-1)_{15}\}^2}$$ [Expression 5]

Thus, the distances $K_{yz}$ between the coordinates represented by the feature vectors of the individual segments obtained by time division are determined for all the segments, a total sum $K_{total}$ of the distances $K_{yz}$ for all the segments is calculated, and the total sum $K_{total}$ is used as a value corresponding to the degree of similarity. Then, the total sum $K_{total}$ is compared to a predetermined threshold Th. When the total sum $K_{total}$ is larger than the threshold Th, it is determined that the degree of similarity is low and there is a change in the road surface state. When the total sum $K_{total}$ is smaller than the threshold Th, it is determined that the degree of similarity is high and there is no change in the road surface state.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of segments, can be used. Alternatively, it is also possible to determine the degree of similarity using various kernel functions. Still alternatively, it may also be possible to calculate the degree of similarity by removing paths having lower degrees of similarity from all the feature vectors without using all the feature vectors.

Subsequently, a description will be given of an operation of the tire device 100 according to the first embodiment with reference to FIGS. 7 and 10.

Figure 7:
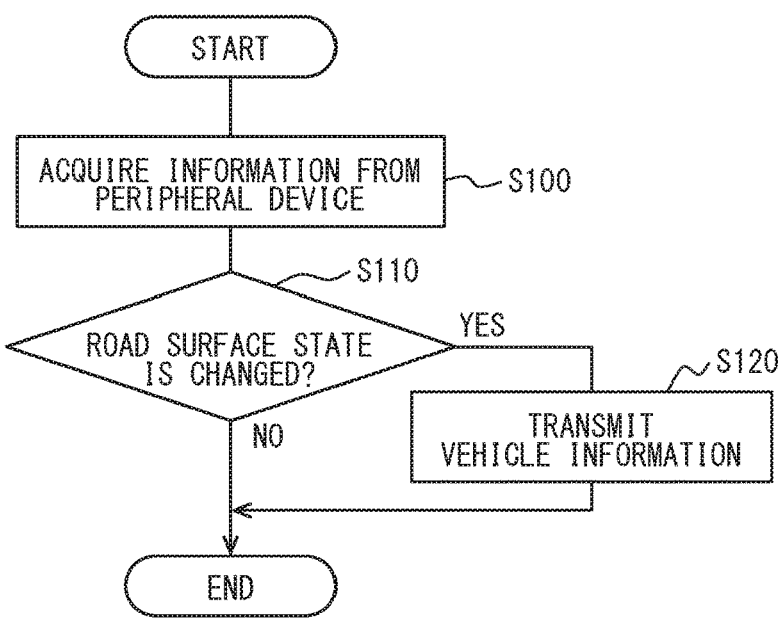
FIG. 7 is a flow chart illustrating a vehicle-body-side determination process performed by a control unit of the vehicle-body-side system.

First, in the vehicle-body-side system 2, the change determination unit 26c performs a vehicle-body-side determination process illustrated in FIG. 7 based on the information related to the road surface state acquired from the peripheral device 24. This process is performed in each predetermined control cycle, e.g., during a period during which an ignition not shown is ON, preferably during the driving traveling of the vehicle.

As illustrated in FIG. 7, in S100, the change determination unit 26c performs a process of acquiring the information related to the road surface state from the peripheral device 24. For example, when the in-vehicle camera is used appropriately as the peripheral device 24, the change determination unit 26c acquires image data. When the wiper device is used appropriately as the peripheral device 24, the change determination unit 26c acquires information showing that the wiper device has been driven. When the brake ECU 22 is used appropriately as the peripheral device 24, the change determination unit 26c acquires information on the road surface friction coefficient or the road surface state.

Subsequently, the change determination unit 26c proceeds to S110 and, as a vehicle-body-side determination, determines whether or not there is a change in the road surface state based on the information acquired in S100. Then, when making an affirmative determination in S110, the change determination unit 26c proceeds to S120 and causes the data communication unit 25 to transmit vehicle-body-side information showing that there is a change in the road surface state to each of the tire-side devices 1. Meanwhile, when making a negative determination in S110, the change determination unit 26c ends the vehicle-body-side determination process without transmitting the vehicle-body-side information. When having transmitted the vehicle-body-side information in S120, the change determination unit 26c subsequently ends the vehicle-body-side determination process.

Figure 8:
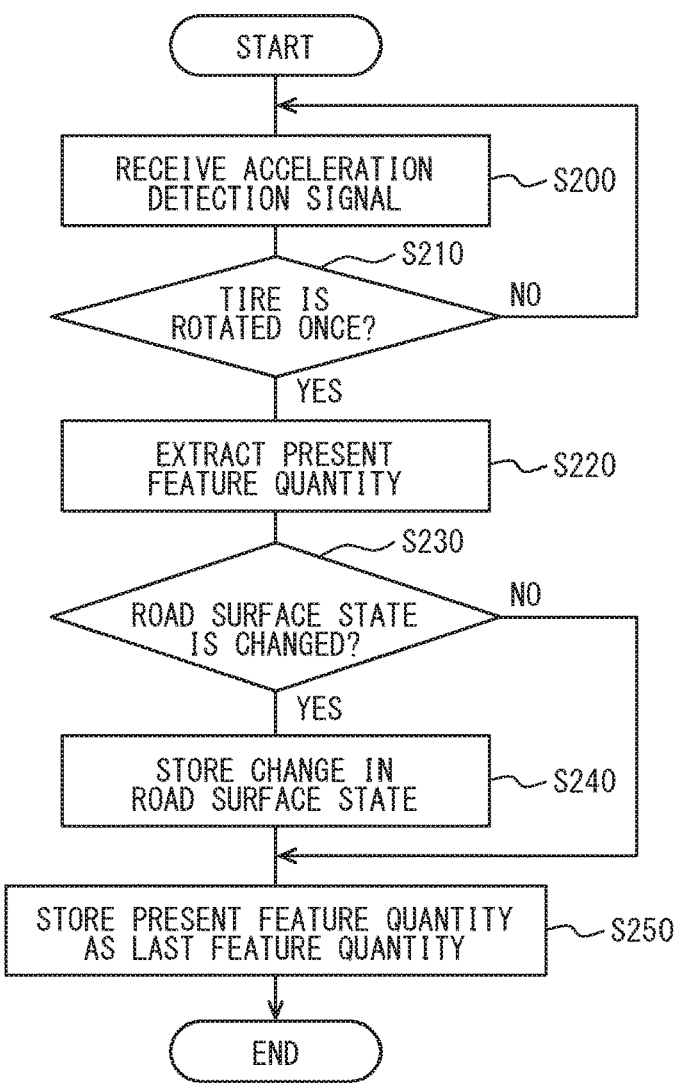
FIG. 8 is a flow chart illustrating a tire-side determination process performed by a control unit of the tire-side device.
Figure 9:
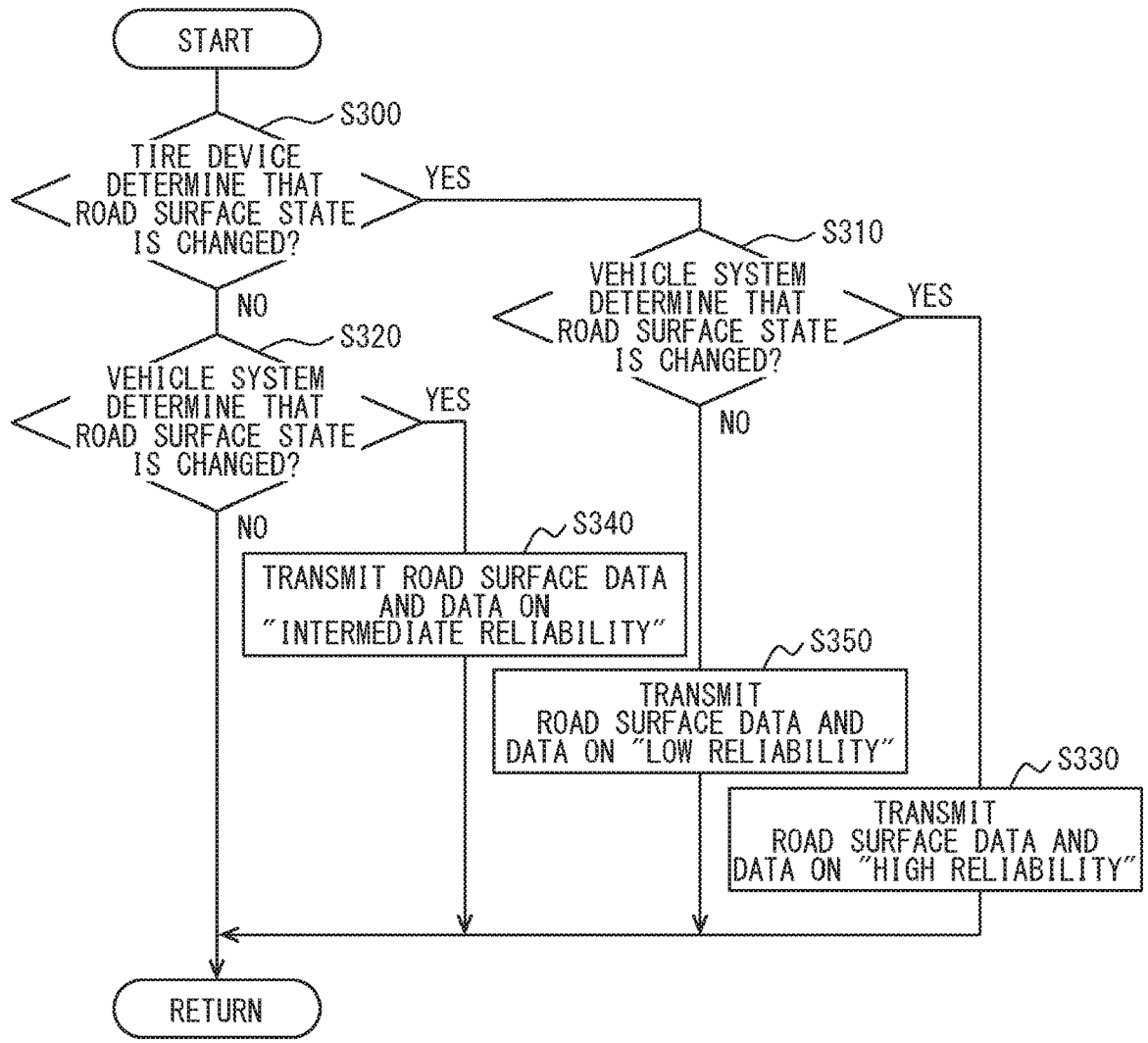
FIG. 9 is a flow chart illustrating a data transmission process performed by the control unit of the tire-side device.

Meanwhile, in the tire-side device 1 of each of the wheels, the control unit 11 performs a tire-side determination process illustrated in FIG. 8 and a data transmission process illustrated in FIG. 9. This process is performed in each predetermined control cycle.

First, as illustrated in FIG. 8, in S200, the control unit 11 performs a process of receiving the detection signal from the acceleration acquisition unit 10. This process is continued during a period before the tire 3 rotates once in subsequent S210. Then, when receiving the detection signal corresponding to one tire rotation from the acceleration acquisition unit 10, the control unit 11 proceeds to S220 and extracts, as the present feature quantity, the feature quantity of the time axis waveform of the received detection signal from the acceleration acquisition unit 10 corresponding to the one tire rotation. The processes in S200 to S220 described above are performed by the feature quantity extraction unit 11a of the control unit 11.

Note that the control unit 11 determines one rotation made by the tire 3 based on the time axis waveform of the detection signal from the acceleration acquisition unit 10. Specifically, since the detection signal exhibits the time axis waveform illustrated in FIG. 4, by recognizing the first peak value and the second peak value of the detection signal, it is possible to recognize one rotation of the tire 3.

Note that the road surface state appears as a change in the time axis waveform of the detection signal particularly during a period including the "step-on region", the "pre-kick-out region", the "kick-out region", and periods before and after these regions. Accordingly, it is sufficient that data during this period is received, and it is not necessarily required that all the data sets represented by the detection signal from the acceleration acquisition unit 10 during one tire rotation are received. For example, with respect to the "pre-step-on region" and the "post-kick-out region", it is sufficient that there is data in the vicinity of the "step-on region" and in the vicinity of the "kick-out region". Therefore, it may also be possible to regard a region of the detection signal from the acceleration acquisition unit 10 where the vibration level is smaller than a threshold as a period included in the "pre-step-on region" or the "post-kick-out region" during which the detection signal is less likely to be affected by the road surface state and prevent the detection signal from being received.

The extraction of the feature quantity performed in S220 is performed exactly in accordance with the method described above.

Then, the control unit 11 proceeds to S230, determines the degree of similarity based on the present feature quantity and on the immediately previous feature quantity in accordance with the method described above. The control unit 11 compares the degree of similarity to, e.g., the threshold Th to determine whether or not there is a change in the road surface state. This process is performed based on the present feature quantity extracted by the feature quantity extraction unit 11a and on the immediately previous feature quantity stored in the feature quantity storage unit 11b in S250 described later.

Then, when making an affirmative determination in S230, the control unit 11 stores the occurrence of the change in the road surface state in S240. Note that the processes in S230 and S240 are performed by the change determination unit 11c of the control unit 11.

The control unit 11 proceeds to S250, stores the present feature quantity as the immediately previous feature quantity in the feature quantity storage unit 11b, and ends the process.

The control unit 11 also performs the data transmission process illustrated in FIG. 9. First, in S300, the control unit 11 determines whether or not the occurrence of the change in the road surface state is determined by the tire-side device 1. This determination is made based on whether or not the occurrence of the change in the road surface state is stored in S240 in FIG. 8 described above. When making an affirmative determination herein, the control unit 11 proceeds to S310. When making a negative determination herein, the control unit 11 proceeds to S320. Then, in each of S310 and S320, the control unit 11 determines whether or not the occurrence of the change in the road surface state is determined by the vehicle-body-side system 2. This determination is made based on whether or not the vehicle-body-side information transmitted in S120 in FIG. 7 described above is received.

Then, in a case where the control unit 11 makes an affirmative determination in S310, the control unit 11 proceeds to S330, adds data on "High Reliability" to the road surface data including data on the present feature quantity, and transmits the road surface data to the data communication unit 12. In a case when the control unit 11 makes an affirmative determination in S320, the control unit 11 proceeds to S340, adds data on "Intermediate Reliability" to the road surface data including the data on the present feature quantity, and transmits the road surface data to the data communication unit 12. Meanwhile, in a case where the control unit 11 makes a negative determination in S310, the control unit 11 proceeds to S350, adds data on "Low Reliability" to the road surface data including the data on the present feature quantity, and transmits the road surface data to the data communication unit 12.

The case where the control unit 11 makes the affirmative determination in S310 corresponds to a case where it is determined by each of the tire-side device 1 and the vehicle-body-side system 2 that there is a change in the road surface state. Accordingly, in this case, it can be said that the reliability of the determination that there is a change in the road surface state is high. Consequently, the road surface data transmitted to the data communication unit 12 includes the data on "High Reliability".

The case where the control unit 11 makes the affirmative determination in S320 corresponds to a case where, while it is not determined by the tire-side device 1 that there is a change in the road surface state, it is determined by the vehicle-body-side system 2 that there is a change in the road surface state. In this case, it can be said that the reliability of the determination that there is a change in the road surface state is relatively high, though not so high as in the case where the control unit 11 makes the affirmative determination in S310. Consequently, the road surface data transmitted to the data communication unit 12 includes the data on "Intermediate Reliability".

The case where the control unit 11 makes the negative determination in S310 corresponds to a case where, while it is determined by the tire-side device 1 that there is a change in the road surface state, it is not determined by the vehicle-body-side system 2 that there is a change in the road surface state. In this case, it can be said that the reliability is relatively low, though there might possibly be a change in the road surface state. Consequently, the road surface data transmitted to the data communication unit 12 includes the data on "Low Reliability".

Note that "Low Reliability" is set in the case where it is determined by the tire-side device 1 that there is a change in the road surface state, while "Intermediate Reliability" is set when it is determined by the vehicle-body-side system 2 that there is a change in the road surface state. However, the highness or lowness of the reliability differs depending on specifications of the system or the like, and therefore it is appropriate to set the higher reliability as "Intermediate Reliability" and set the lower reliability as "Low Reliability".

When the road surface data is thus transmitted from the transmission control unit 11d to the data communication unit 12, the data communication unit 12 outputs the road surface data to the receiver 21. As a result, the receiver 21 receives the road surface data from each of the tire-side devices 1. Thus, the data communication unit 12 transmits the road surface data including the present feature quantity when there is a change in the road surface state. The data communication unit 12 does not transmit the data when there is no change in the road surface state. Therefore, it is possible to reduce a communication frequency and save power for the control unit 11 in the tire 3.

Figure 10:
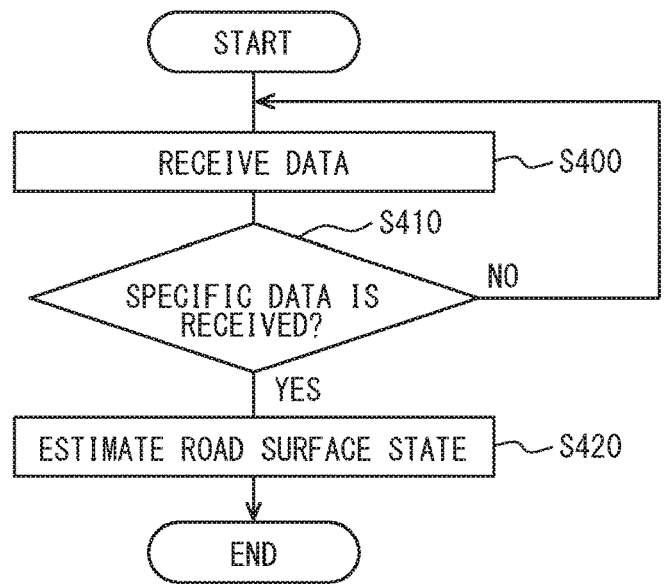
FIG. 10 is a flow chart illustrating a road surface state estimation process performed by the control unit of the vehicle-body-side system.

In addition, in the receiver 21, the control unit 26 performs a road surface state estimation process illustrated in FIG. 10. This process is performed in each predetermined control cycle.

First, in S400, a data reception process is performed. When the data communication unit 25 receives the road surface data, this process is performed by the control unit 26 by retrieving the road surface data. When the data communication unit 25 has not performed data reception, the control unit 26 ends the present process without retrieving any road surface data.

Then, the control unit 26 proceeds to S410, determines whether or not there is data reception. When data has been received, the control unit 26 proceeds to S420. When no data has been received, the control unit 26 repeats the processes in S400 and S410 until data is received.

Then, the control unit 26 proceeds to S420 and estimates the road surface state. The estimation of the road surface state is performed by comparing the present feature quantity included in the received road surface data to the support vectors stored for each type of the road surface in the support vector storage unit 26a. For example, the control unit 26 determines the degrees of similarity of the present feature quantity to all the support vectors stored for each type of the road surface, and determines that the road surface corresponding to the support vectors having the highest degree of similarity is the currently traveled road surface. The arithmetic determination of the degrees of similarity can be performed by using the same method as used to calculate the degree of similarity of the present feature quantity to the immediately previous feature quantity in S230 in FIG. 7.

As described above, since the data indicating the highness or lowness of the reliability is also added to the data on the present feature quantity, it is also possible to perform the estimation using a different method of estimating the road surface state depending on the reliability.

For example, individual elements of a determinant indicative of feature quantity to be used to estimate the road surface state include elements which are marked on a dry road, elements which are marked on a wet road surface, elements which are marked on a frozen road, and the like. Accordingly, in the case of "High Reliability", the degree of similarity is calculated by not using all the elements of the determinant indicative of the feature quantity included in the road surface data, but retrieving the elements which are particularly marked on a specific one of the road surfaces and using the retrieved elements. In the case of "Intermediate Reliability", the degree of similarity is calculated using a larger number of elements than those used in the case of "High Reliability". In the case of "Low Reliability", the degree of reliability is calculated using all the elements of the determinant.

By thus changing the elements to be used to calculate the degree of similarity based on the highness or lowness of the reliability, it is possible to calculate the degree of similarity using a smaller number of selectively retrieved elements. Accordingly, by retrieving the elements which are particularly marked on a specific one of the road surfaces as in the case of, e.g., "High Reliability", it is possible to more reliably estimate the road surface state. For example, there are cases where a pre-change road surface state estimated by the vehicle-body-side system 2 is a dry road surface and, when the road surface state changes, a post-change road surface state is either a wet road or a frozen road, but it is not clear which one of the wet road and the frozen road corresponds to the post-change road surface. In that case, by extracting the elements which are marked on the wet road and the elements which are marked on the frozen road and calculating the degree of similarity using the extracted elements, it is possible to more reliably estimate whether the post-change road surface state is the wet road or the frozen road.

In this configuration, it is also possible to estimate the road surface state using a smaller amount of data depending on the reliability. Consequently, it is also possible to vary the amount of data to be transmitted as the road surface data from each of the tire-side devices 1 depending on the highness of the reliability. This configuration can further reduce power required for data transmission and thereby further save power.

The estimation of the road surface state by the tire device 100 according to the first embodiment is performed as described above. When the tire device 100 performs such estimation of the road surface state, the tire-side device 1 transmits the road surface data including the present feature quantity with the time point with which the road surface state has changed. Specifically, with the time point with which the tire-side device 1 or the vehicle-body-side system 2 determines that the road surface state has changed, the tire-side device 1 transmits the road surface data. Consequently, it is possible to reduce the communication frequency and save power for the control unit 11 in the tire 3.

In addition, in the tire device 100, the control unit 11 of the tire-side device 1 need not include the support vector storage unit for storing the support vectors. Accordingly, it is also possible to save a memory storage capacity for the control unit 11 in the tire 3.

The data processing for the calculation of the degree of similarity which is performed by the control unit 11 of the tire-side device 1 is performed appropriately with respect to the present feature quantity and to the immediately previous feature quantity. Meanwhile, the calculation of the degrees of similarity of the present feature quantity to all the support vectors may be performed appropriately by the vehicle-body-side system 2. As a result, it is possible to further reduce memory consumption in the control unit 11 in the tire 3 and save the memory storage capacity.

Therefore, it is possible to provide the tire-side device 1 which can save the memory storage capacity and power for the control unit 11 in the tire 3 and the tire device 100 including the tire-side device 1.

Not only when the tire-side device 1 determines the occurrence of the change in the road surface state but also when the vehicle-body-side system 2 determines the occurrence of the change in the road surface state, the tire-side device 1 transmits the road surface data. As a result, even when the tire-side device 1 cannot recognize a change in the road surface state, it is possible to transmit the road surface data to the vehicle-body-side system 2 and more accurately recognize the change in the road surface state.

In addition, by causing the road surface data to include also the data related to the reliability, it is also possible to estimate the road surface state using a different estimation method depending on the reliability. For example, it is also possible to estimate the road surface state using a smaller amount of data depending on the reliability. Accordingly, it is also possible to vary the amount of data to be transmitted as the road surface data from each of the tire-side devices 1 depending on the highness of the reliability. This can further reduce power required for data transmission and thereby further save power.

Second Embodiment

A description will be given of the second embodiment. In contrast to the first embodiment, the second embodiment allows each of the tire-side devices 1 to estimate the road surface state. The second embodiment is otherwise the same as the first embodiment, and therefore a description will be given only of portions different from those in the first embodiment.

Figure 11:
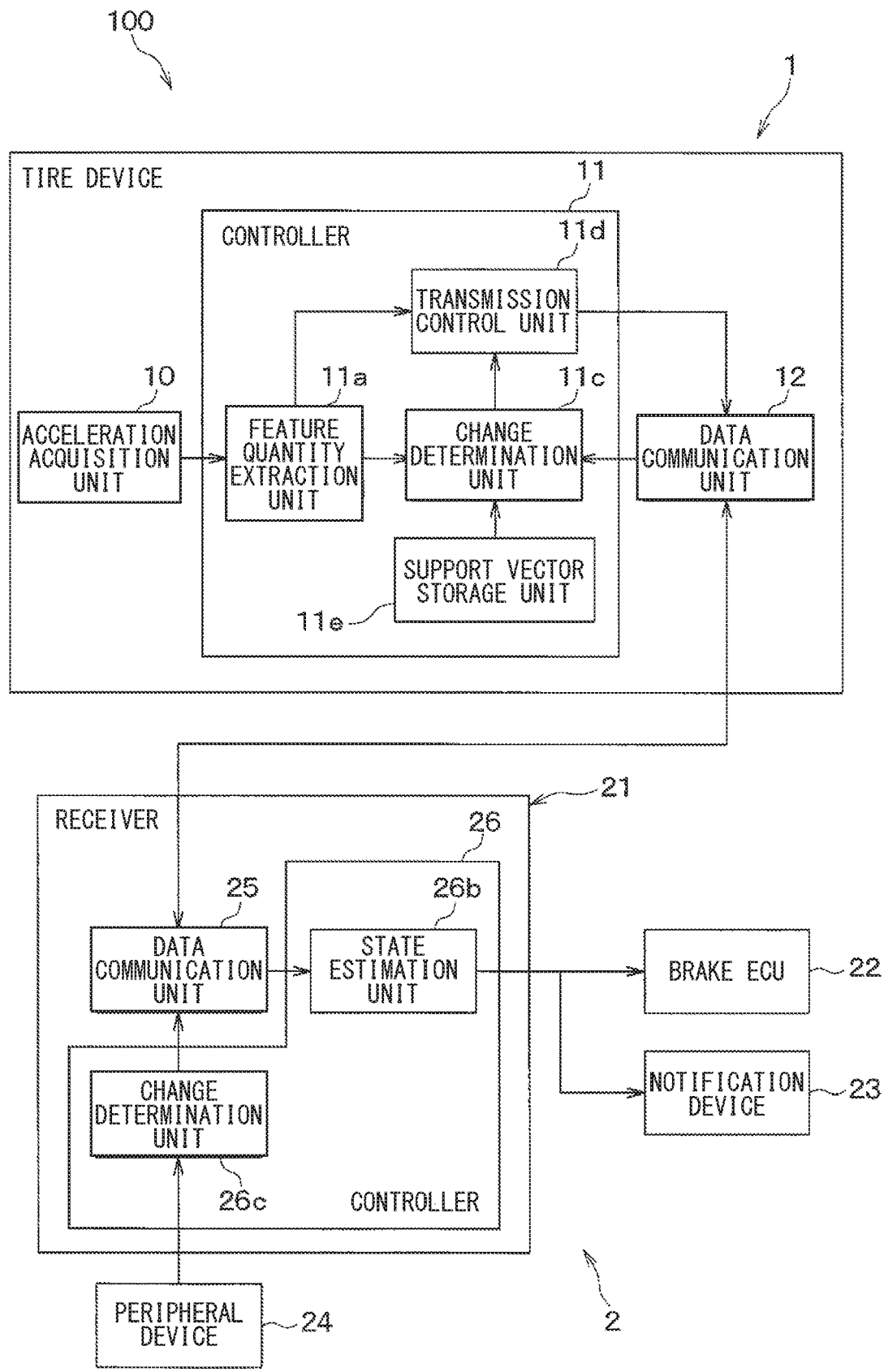
FIG. 11 is a block diagram illustrating a tire-side device and a vehicle-body-side system which are included in a tire device according to a second embodiment.

In the second embodiment, as illustrated in FIG. 11, a support vector storage unit 11e is provided instead of the feature quantity storage unit 11b provided in the first embodiment, while the support vector storage unit 26a of the receiver 21 is eliminated. In addition, the change determination unit 11c calculates the degrees of similarity between the present feature quantity extracted by the feature quantity extraction unit 11*a* and all the support vectors stored in the support vector storage unit 11*e* to allow the tire-side device 1 to determine a change in the road surface state. Then, when there is a change in the road surface state, the tire-side device 1 transmits, as the road surface data, data indicative of a result of the estimation of the road surface state based on the arithmetic determination of the degrees of similarity.

Meanwhile, the receiver 21 receives the road surface data transmitted from the tire-side device 1 and causes the state estimation unit 26*b* to transmit the road surface state represented by the road surface data to the brake ECU 22 and to the notification device 23.

Thus, it is also possible to allow the tire-side device 1 to include the support vector storage unit 11*e* and allow the tire-side device 1 to estimate the road surface state. In this case also, it is possible to determine whether or not there is a change in the road surface state based on a result of the estimation. Accordingly, when there is a change in the road surface state or the vehicle-body-side information is transmitted to the tire-side device 1 from the vehicle-body-side system 2, the tire-side device 1 can transmit the result of the estimation of the road surface state or the road surface data including the feature quantity. As a result, while the effect of saving the memory storage capacity for the control unit 11 in the tire 3 cannot be obtained, the same effects as obtained from the first embodiment, such as allowing power saving, can be obtained.

Third Embodiment

A description will be given of the third embodiment. In contrast to the first embodiment, the third embodiment does not allow each of the tire-side devices 1 to determine a change in the road surface state based on the feature quantity, but allows each of the tire-side devices 1 to determine a change in the road surface state based on the vehicle-body-side information transmitted from the vehicle-body-side system 2. The third embodiment is otherwise the same as the first embodiment, and therefore a description will be given only of portions different from those in the first embodiment.

Figure 12:
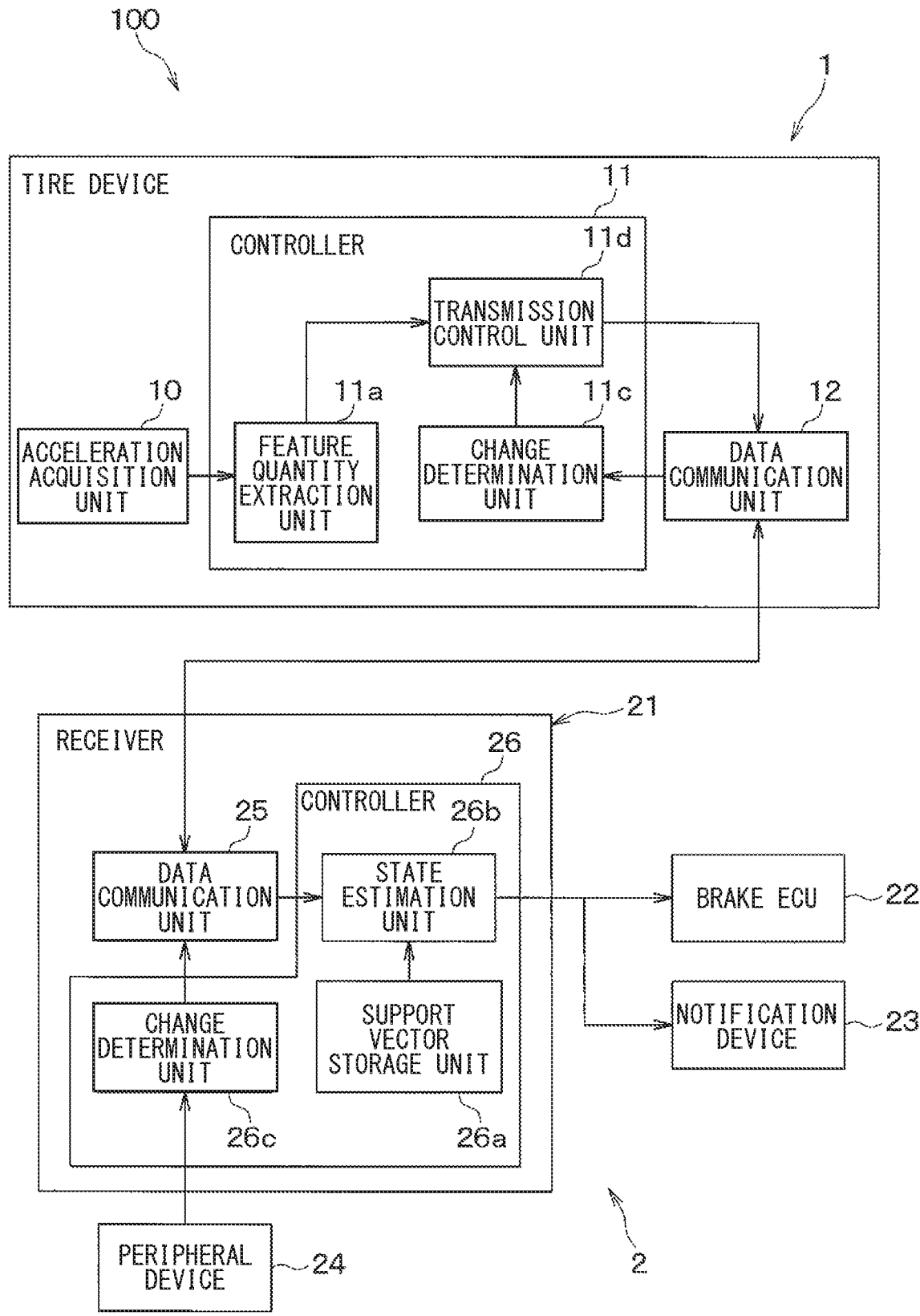
FIG. 12 is a block diagram illustrating a tire-side device and a vehicle-body-side system which are included in a tire device according to a third embodiment.

In the third embodiment, as illustrated in FIG. 12, the feature quantity storage unit 11*b* provided in the first embodiment is eliminated. In addition, the change determination unit 11*c* is allowed to determine the occurrence of a change in the road surface state based on the vehicle-body-side information transmitted from the vehicle-body-side system 2. Then, when there is a change in the road surface state, the tire-side device 1 transmits the road surface data including the feature quantity.

Meanwhile, when determining that there is a change in the road surface state based on the information from the peripheral device 24, the receiver 21 transmits the vehicle-body-side information to the tire-side device 1. The receiver 21 also receives the road surface data transmitted from the tire-side device 1 and causes the state estimation unit 26*b* to compare the feature quantity included in the road surface data to the support vectors stored for each type of the road surface in the support vector storage unit 26*a* to thus estimate the road surface state. Then, the state estimation unit 26*b* transmits a result of the estimation of the road surface state to the brake ECU 22 and to the notification device 23.

Specifically, first, as described in the first embodiment, the vehicle-body-side system 2 performs the vehicle-body-side determination process illustrated in the flow chart of FIG. 7 to determine a change in the road surface state based on the peripheral device 24. When determining that there is a change in the road surface state based on the process, the vehicle-body-side system 2 transmits the vehicle-body-side information indicating that there is a change in the road surface state.

Figure 13:
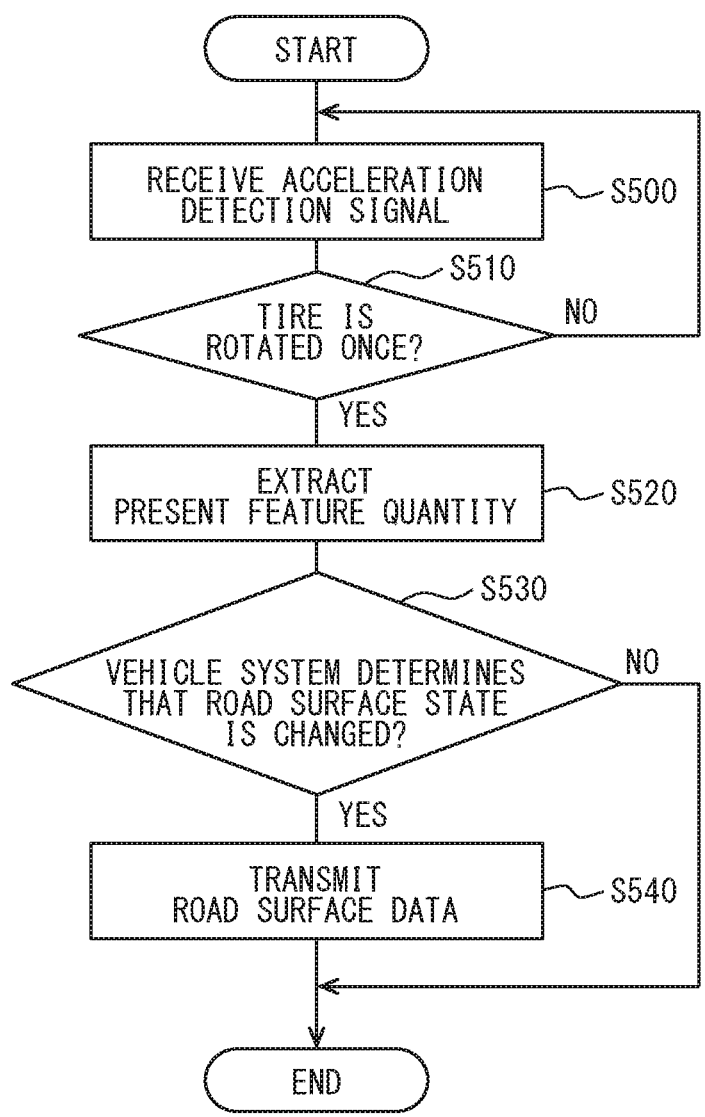
FIG. 13 is a flow chart illustrating a tire-side determination process described in the third embodiment.

Meanwhile, the tire-side device 1 performs a tire-side determination process illustrated in FIG. 13. First, in S500 to S520, the similar processes as performed in S200 to S220 of the tire-side determination process illustrated in FIG. 8 are performed. In S530, the tire-side device 1 determines whether or not the occurrence of the change in the road surface state is determined by the vehicle-body-side system 2. When the vehicle-body-side information showing the determination of the occurrence of the change in the road surface state is transmitted to the tire-side device 1 from the vehicle-body-side system 2, the tire-side device 1 makes an affirmative determination. When the vehicle-body-side information is not transmitted to the tire-side device 1 from the vehicle-body-side system 2, the tire-side device 1 makes a negative determination. When making the affirmative determination, the tire-side device 1 proceeds to S540, transmits the road surface data including the present feature quantity obtained in S520, and ends the process. When making the negative determination, the tire-side device 1 immediately ends the process.

Thereafter, the tire-side device 1 performs the road surface state estimation process illustrated in FIG. 10 to allow load surface state estimation to be performed based on the road surface data transmitted from the tire-side device 1.

Thus, the vehicle-body-side system 2 transmits the vehicle-body-side information to the tire-side device 1 when determining that the road surface state has changed. When transmitting the vehicle-body-side information, the vehicle-body-side system 2 causes the tire-side device 1 to transmit the road surface data.

In such a configuration, the tire-side device 1 cannot determine the occurrence of a change in the road surface state. However, since the tire-side device 1 need not make the determination of the occurrence of a change in the road surface state, it is possible to further save the memory storage capacity for the control unit 11 in the tire 33. In addition, since it is possible to request the road surface data from the tire-side device 1 when the vehicle-body-side system 2 requires the road surface data, the data transmission from the tire-side device 1 can further be limited. Therefore, it is possible to save power for the control unit 11 of the tire-side device 1.

Other Embodiments

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

For example, in the feature quantity storage unit 11*b*, as the feature quantity during the previous rotation of the tire 3, the feature quantity during the immediately previous rotation are stored. However, the feature quantity of the tire 3 during the previous rotation need not necessarily be the feature quantity during the immediately previous rotation. Specifically, the storage of the feature quantity (hereinafter referred to as the previous feature quantity) during the previous rotation of the tire 3 in the feature quantity storage unit 11b is not limited to the storage of the immediately previous feature quantity in the feature quantity storage unit 11b. It may also be possible to store the feature quantity during the rotation prior to a plurality of rotations as the previous feature quantity, or store an average value of the previous feature quantity corresponding to a plurality of rotations. For the calculation of the degree of similarity to the immediately previous feature quantity, it may also be possible to use the immediately previous feature quantity included in the previous feature quantity or an average value of the plurality of previous feature quantity including the immediately previous feature quantity. However, in terms of saving the memory storage capacity, it is preferred to store the feature quantity the number of which is as small as possible.

Also, in each of the embodiments described above, the case where the vibration detection unit is formed of the acceleration acquisition unit 10 is shown by way of example. However, the vibration detection unit can also be provided by another element capable of detecting vibration such as, e.g., a piezoelectric element.

The road surface data including the present feature quantity is transmitted from the tire-side device 1 when there is a change in the road surface state. The road surface data may also include the immediately previous feature quantity. In that case, in the vehicle-body-side system 2, the immediately previous feature quantity is compared to the support vector to allow even the road surface state before the change to be estimated. Accordingly, it is possible to estimate both the road surface states before and after the change and more accurately recognize the change in the road surface state.

Also, in each of the embodiments described above, the control unit 26 of the receiver 21 included in the vehicle-body-side system 2 determines the degrees of similarity of the present feature quantity to the support vectors, and estimates the road surface state. However, this is an exemplary, and it may also be possible that a control unit of another ECU, e.g., the brake ECU 22 may determine the degrees of similarity or estimate the road surface state.

In each of the embodiments described above, the tire-side device 1 is provided in each of the plurality of tires 3. However, it is sufficient that the tire-side device 1 is provided in at least one of the plurality of tires 3.

What is claimed is:

1. A road surface state estimation device comprising:
    a tire-side device disposed in a tire and configured to transmit road surface data as data related to a road surface state; and
    a vehicle-body-side system disposed in a vehicle body, and configured to receive the road surface data and estimate the road surface state, wherein
    the tire-side device includes
        a vibration detection unit configured to output a detection signal corresponding to a magnitude of vibration of the tire,
        a first controller configured to generate the road surface data based on the detection signal, and
        a first transceiver configured to perform data communication with the vehicle-body-side system;
    the vehicle-body-side system includes
        a peripheral device configured to acquire information related to the road surface state,
        a second transceiver configured to perform the data communication with the tire-side device, and
        a second controller configured to cause, when determining an occurrence of a change in the road surface state based on the information related to the road surface state acquired by the peripheral device, the second transceiver to transmit vehicle-body-side information indicating the occurrence of the change in the road surface state to the tire-side device, and estimate the road surface state based on the road surface data received by the second transceiver; and
    the first controller includes
        a change determination unit configured to determine the occurrence of the change in the road surface state based on the detection signal, and
        a transmission control unit configured to cause, when the change determination unit determines the occurrence of the change in the road surface state or when the first transceiver receives the vehicle-body-side information, the first transceiver to transmit the road surface data.

2. The road surface state estimation device according to claim 1, wherein:
    the first controller further includes
        a feature quantity extraction unit configured to extract a feature quantity of the detection signal during one rotation of the tire, and generate the road surface data including the feature quantity, and
        a feature quantity storage unit configured to store, as a previous feature quantity, the feature quantity extracted in a previous rotation of the tire;
    the change determination unit determines the occurrence of the change in the road surface state based on a present feature quantity that is the feature quantity extracted in a present rotation of the tire and the previous feature quantity stored in the feature quantity storage unit; and
    the transmission control unit causes the first transceiver to transmit the road surface data including the present feature quantity.

3. The road surface state estimation device according to claim 2, wherein:
    the change determination unit calculates degree of similarity of the present feature quantity to the previous feature quantity, and determines the occurrence of the change in the road surface state based on the degree of similarity.

4. The road surface state estimation device according to claim 2, wherein
    the feature quantity storage unit stores, as the previous feature quantity, an immediately previous feature quantity that is the feature quantity extracted in an immediately previous rotation; and
    the change determination unit determines the occurrence of the change in the road surface state based on the present feature quantity and the immediately previous feature quantity.

5. The road surface state estimation device according to claim 2, wherein
    the feature quantity extracted by the feature quantity extraction unit is represented by a feature vector of a time axis waveform of the detection signal.

6. The road surface state estimation device according to claim 2, wherein
    the second controller includes
        a support vector storage unit configured to store a support vector of the feature quantity for each type of the road surface state, and
        a state estimation unit configured to estimate the road surface state based on the present feature quantity included in the road surface data and the support vector stored in the support vector storage unit.

7. The road surface state estimation device according to claim 1, wherein:

when both of the determination of the occurrence of the change in the road surface state and the reception of the vehicle-body-side information occur, the first controller causes the road surface data to include data indicative of a high reliability of the occurrence of the change in the road surface state; and when one of the determination of the occurrence of the change in the road surface state and the reception of the vehicle-body-side information occurs, the first controller causes the road surface data to include data indicative of a low reliability of the occurrence of the change in the road surface state.

8. A road surface state estimation device comprising:

a tire-side device disposed in a tire and configured to transmit road surface data as data related to a road surface state; and a vehicle-body-side system disposed in a vehicle body, and configured to receive the road surface data and estimate the road surface state, wherein the tire-side device includes
- a vibration detection unit configured to output a detection signal corresponding to a magnitude of vibration of the tire,
- a first controller configured to generate the road surface data based on the detection signal, and
- a first transceiver configured to perform data communication with the vehicle-body-side system;

the vehicle-body-side system includes
- a peripheral device configured to acquire information related to the road surface state,
- a second transceiver configured to perform the data communication with the tire-side device, and
- a second controller configured to receive and cause, when determining an occurrence of a change in the road surface state based on the information related to the road surface state acquired by the peripheral device, the second transceiver to transmit vehicle-body-side information indicating the occurrence of the change in the road surface state to the tire-side device, and estimate the road surface state based on the road surface data received by the second transceiver; and the first controller causes the first transceiver to transmit the road surface data to the vehicle-body-side system when the first transceiver receives the vehicle-body-side information.

9. The road surface state estimation device according to claim 8, wherein:

the first controller further includes a feature quantity extraction unit configured to extract a feature quantity of the detection signal during one rotation of the tire, and generate the road surface data including the feature quantity; and the transmission control unit transmits the road surface data including a present feature quantity that is the feature quantity extracted in a present rotation.

10. The road surface state estimation device according to claim 8, wherein:

the first controller further includes a feature quantity extraction unit configured to extract a feature quantity of the detection signal during one rotation of the tire, and generate the road surface data including the feature quantity.

* * * * *